United States Patent
Schillereff

(10) Patent No.: US 6,521,125 B1
(45) Date of Patent: Feb. 18, 2003

(54) OIL/HYDROCARBON REMOVAL SYSTEM

(75) Inventor: David Schillereff, Wolfeboro, NH (US)

(73) Assignee: Asahi/America, Inc., Malden, MA (US)

( * ) Notice: Subject to any disclaimer, the term of this patent is extended or adjusted under 35 U.S.C. 154(b) by 342 days.

(21) Appl. No.: 09/644,271

(22) Filed: Aug. 23, 2000

(51) Int. Cl.[7] .............................................. B01D 24/00
(52) U.S. Cl. ..................... 210/266; 210/291; 210/484; 210/497.01; 210/499; 210/502.1
(58) Field of Search ............................ 210/484, 497.01, 210/499, 502.1, 266, 291

(56) References Cited

U.S. PATENT DOCUMENTS

| | | |
|---|---|---|
| 4,032,453 A | 6/1977 | Pedone |
| 4,210,538 A | 7/1980 | Tantilla et al. |
| 4,419,240 A | 12/1983 | Rosaen |
| 5,151,194 A | 9/1992 | Simpson et al. |
| 5,178,769 A | 1/1993 | Simpson et al. |
| 5,609,760 A | 3/1997 | Leach |

*Primary Examiner*—Chester T. Barry
(74) *Attorney, Agent, or Firm*—Gerald E. Hespos; Anthony J. Casella

(57) ABSTRACT

A filtration system is provided for removing oil and/or hydrocarbons from blige water that collects in the blige of a marine vessel to ensure discharge of oil-free water into the surrounding waters of the vessel. The filtering medium of the system is composed of a mixture of peat, anthracite and bentonite resulting in a composition that is hydrophobic and olephilic. Due to the chemical composition of the medium, it burns efficiently and can be disposed of in the onboard incinerators of the vessel producing over 17,000 BTU's per pound. Also, the filtration system employs full backwash capability for filtering liquids combined with particulates.

17 Claims, 2 Drawing Sheets

OIL/HYDROCARBON REMOVAL SYSTEM

BACKGROUND OF THE INVENTION

The present invention relates to an oil removal filtration system for removing oil and hydrocarbons from water. More particularly, the present invention is directed to a filtration system which removes all oil and hydrocarbons from the bilge water that collects in the bilge of a marine vessel to ensure discharge of oil-free water into to the surrounding waters.

For purposes of the present invention, the term "oil" is intended to include a wide variety of petroleum products such as engine oil, lubricating oil, diesel fuel, gasoline, etc. Also, for the purposes of the present invention, the term "hydrocarbon" will be used interchangeably with the term "oil". In the operation of virtually all engine powered marine vessels having inboard engines, a wide variety of petroleum products are utilized in conjunction with engine operation. During operation of the engine or engines, a certain quantity of engine oil can be lost through engine seals and into the bilge of the vessel. Regardless of how clean and how well cared for is the engine system of the vessel, it is virtually always the case that at least a small amount of engine oil is lost into the bilge. This engine oil tends to coat all of the exposed surfaces in the bilge and can combine with other contaminants, such as dust and certain marine life, to develop a coating or buildup of oily residue in the bilge. Also, during operation of the engine and during servicing of the engine, small amounts of lubricating oil are frequently lost into the bilge due to minute leakage thereof during prolonged engine operation.

Inboard engines, especially in larger marine vessels typically have power output drive shafts that extend through seals in wall surfaces of the vessel, especially the bottom and transom surfaces. There rotary shaft seals are almost always subject to a small volume of water leakage as the shafts are rotated during vessel operation. This water leakage will build up in the bilge of the vessel; consequently it must be periodically removed from the bilge and pumped overboard by means of bilge water discharge lines having orifice openings externally of the vessel's hull. For the reason that leaked oil continuously collects in the bilge and leaked water through the shaft seals also collects in the bilge, the bilge water in marine vessels is virtually always contaminated with oil that it picks up from bilge deposits. In the past, bilge water pumping systems have been provided which operate automatically or by manual selection and which function to pump bilge water, even though contaminated with oil, out of the bilge of the vessel and into the surrounding water.

The Federal Water Pollution Control Act (FWPCA) prohibits the discharge of oil or hazardous substances in to the waters of the United States. To comply with this act, large marine vessels have employed oil-water separators to remove the oil from the bilge water before discharging it into the surrounding waters. Conventional oil-water separators separate oil from water by a mechanical means which does not efficiently remove small oil particles. In enforcing the FWPCA, the Coast Guard requires any bilge water that is to be discharge overboard into the surrounding waters must contain less than fifteen parts per million (PPM) of oil, or else it cannot be discharged. If the vessel's oil-water separators cannot maintain the required PPM levels, the vessel must contain the water and discharge it while they are in port at a cost per gallon. Theoretically, if the water is continuously recirculated through the oil water separator, the oil PPM levels may fall below the allowable discharge level. But due to the large volume of water that needs to be treated within a limited period of time as these ships are traveling from port to port, the conventional oil-water separator cannot obtain the maximum PPM levels by the recirculation method alone.

It is an object of the subject invention to provide an oil removal filtration system for removing all oil and hydrocarbons from water.

It is another object of the subject invention to provide an oil removal system for bilge water of a marine vessel.

It is another object of the subject invention to provide an oil removal system which accepts an oily effluent from an oil-water separator and completely removes any oil and/or hydrocarbons to a level of zero PPM.

It is of further object of the subject invention to provide an oil removal system where the charge of the filter can be easily disposed of onboard the vessel.

SUMMARY OF THE INVENTION

The above stated objects are met by a new and improved oil removal filtration system for bilge water of marine vessels. The subject oil filtration system comprises a generally cylindrical, upright housing including an upper and lower end. The lower end of the housing is closed off by a first, circular end cap which includes a circular aperture adapted for a threaded coupling. The threaded coupling is connected to an inlet pipe which introduces an oily effluent into the filtration system. The upper end of the cylindrical housing is closed off by a second end cap similar to the first end cap. The second end cap comprises an aperture for coupling the system to an outlet pipe to discharge the oil-free water. The cylindrical housing defines an interior chamber which houses an oil/hydrocarbon removal filtering charge. The filter charge and system are manufactured under the trademark NOMIS by the assignee of this application.

The multi-component charge is assembled away from the filter housing and is inserted into the housing as one unit. The charge comprises a center tube which runs the length of the charge and is as long as the upright housing of the filter. The tube includes two ends: a first end adapted to couple to the aperture of the lower, first end cap of the filter housing and a second end which likewise is adapted to couple to the aperture of the upper, second end cap of the housing. The center tube includes a series of vertical slots placed circumferentially around the tube. A sleeve formed from an extruded polypropylene mesh is slid over the center tube to prevent particulate from entering the center tube. A micron-rated polypropylene fabric surrounds the sleeve and prevents the filtering medium from entering the center tube and being discharged. Additional fabric is then stitched into a cylindrical form with one end being secured to the lower, first end of the center tube. The area between the two polypropylene fabrics into then filled with the filtering medium.

The filtering medium consists of three parts: peat moss, anthracite and bentonite. The peat is an engineered material and has the characteristics of being hydrophobic and oleophilic, that is, has the ability to resist water while attracting oil or hydrocarbons. The engineered peat has a weight-absorption ratio of 8-to-1. Since peat is compressible, the anthracite and bentonite are added to the medium composition to create voids in it so that the peat does not become fully compressed and unable to pass water. While the carbon granules of the anthracite and the clay-like bentonite prevent the peat medium from being compressed, they are also oil absorbent and contribute to the oil/hydrocarbon removal of the filtering system.

Once the filtering medium is placed in the charge, the top of the outer polypropylene fabric is secured to a retaining disk to completely retain the filtering medium within the charge. The charge, which is substantially cylindrical when assembled, is placed in the interior chamber of the housing. A horizontal partitioning disk is positioned above the retaining disk to come into contact with the wall of the cylindrical housing to separate the interior chamber into a lower and upper chamber. The partitioning disk is formed to accept an O-ring to insure liquid-tight separation between the lower and upper chambers. The upper, second end cap is then secured in place by retaining elements to complete the filtering assembly.

In normal usage, effluent from the oil-water separators is pumped to the filtering system through the inlet pipe located at the bottom of the upright, cylindrical housing. The liquid fills the lower, interior chamber, and being pressurized, is forced through the filter medium and inner sleeves toward the center tube. As the liquid passes through the outer polypropylene fabric, particulate matter is caught in the fabric and prevented from entering the medium. As particulate-free liquid is forced through the medium, oil/hydrocarbons are absorbed and oil-free water flows to the upper chamber and out the upper, second end cap through the outlet pipe. The oil-free water can now be discharged into the surrounding waters without any environmental impact.

The output of the system will be continuously monitored to ensure the hydrocarbon levels are below 15 PPM. As the charge becomes spent or filled with oil/hydrocarbons, the output level will begin to rise indicating the charge needs to be replaced. The differential pressure across the filter will also be monitored. An increase in differential pressure will indicate the filter is becoming clogged or blocked. This blockage usually results from particulate matter loading on the outer surface of the polypropylene fabric. To resolve the particulate loading, especially when the charge is not spent, the new and improved filtering system has backwashing capabilities. In backwashing mode, air and water are introduced in the opposite direction from the normal flow path. While this process disposes of the particulate filtered by the system, the filtering medium will retain the oil/hydrocarbons.

Another advantage of the filtering system of the subject invention is in the disposal of the filtering charge. First, since the medium of the charge is organic, it is biodegradable. If the charge was buried in a landfill, it would retain the oil without leaching it into the ground water. Once the oil degrades, the medium would also biodegrade naturally. Secondly, because of the oil and chemistry of the medium, the charge will maintain a very high BTU value, about 17,000 per pound, when burned. Therefore, the charges can be incinerated onboard of a vessel and used as fuel by the vessel's incinerator.

These and other features of the present invention will become apparent from the following detailed description considered in connection with the accompanying drawings. It should be understood, however, that the drawings are designed for the purpose of illustration only and not as a definition of the limits of the invention.

DETAILED DESCRIPTION OF THE INVENTION

Figure 1:
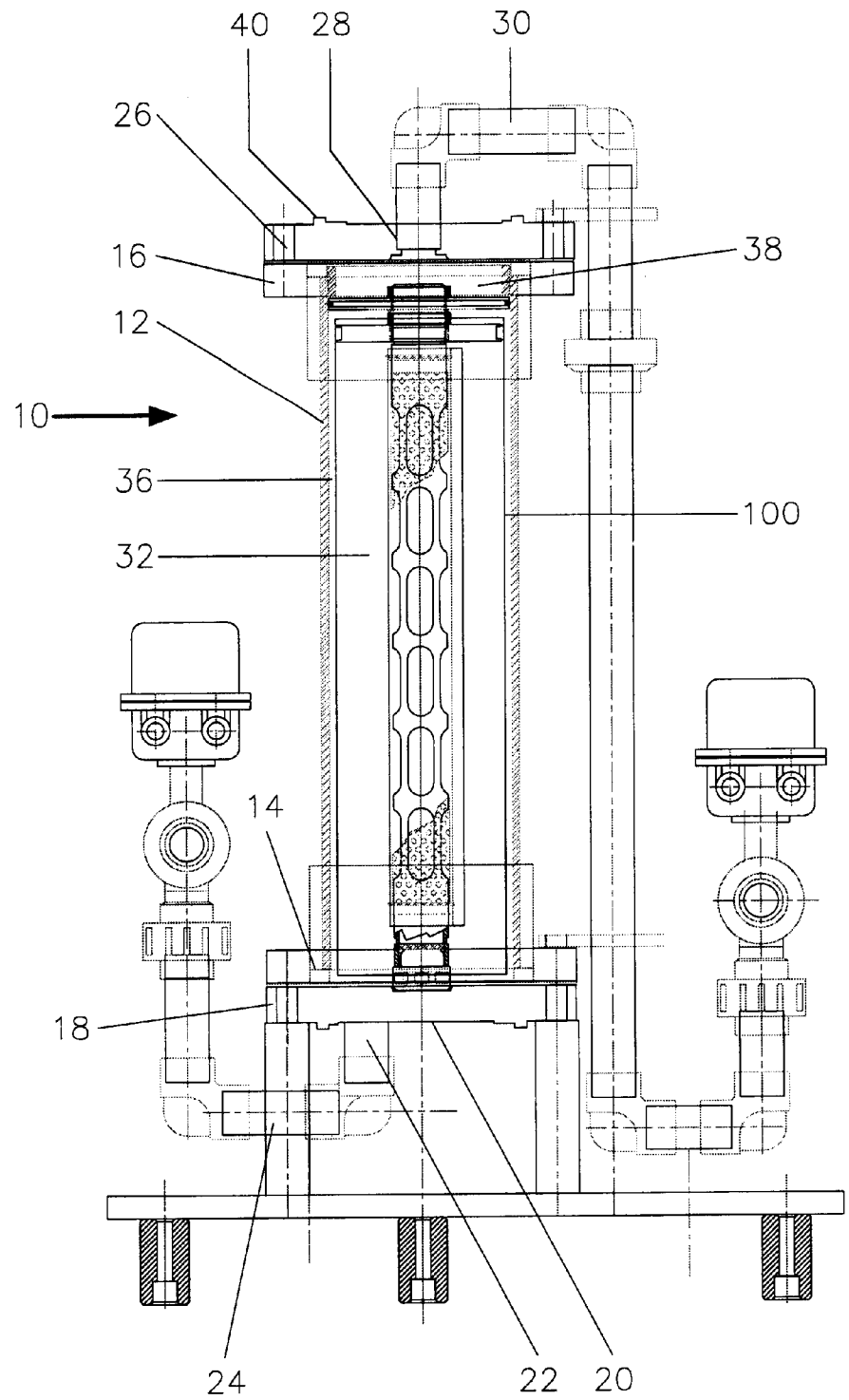
FIG. 1 is a cross-sectional view of the oil/hydrocarbon removal filtration system of the subject invention.

Referring to FIG. 1, the oil removal filtration system of the present invention is generally indicated by the reference numeral 10. The subject oil filtration system comprises a generally cylindrical, upright housing 12 including a lower end 14 and an upper end 16. The lower end 14 of the housing 12 is closed off by a first circular end cap 18 which includes a circular aperture 20 adapted for a threaded coupling 22. The threaded coupling 22 is connected to an inlet pipe 24 which introduces an oily effluent from a conventional oil-water separator. The upper end 16 of the cylindrical housing 12 is closed off by a second end cap 26 similar to the first end cap 18. The second end cap 26 comprises an aperture for coupling the system to outlet pipe 30 to discharge the oil-free water from the oil removal filtration system 10. The cylindrical housing 12 defines an interior chamber 32 which houses an oil/hydrocarbon removal filtering charge 100, which will now be describe in more detail.

Figure 2:
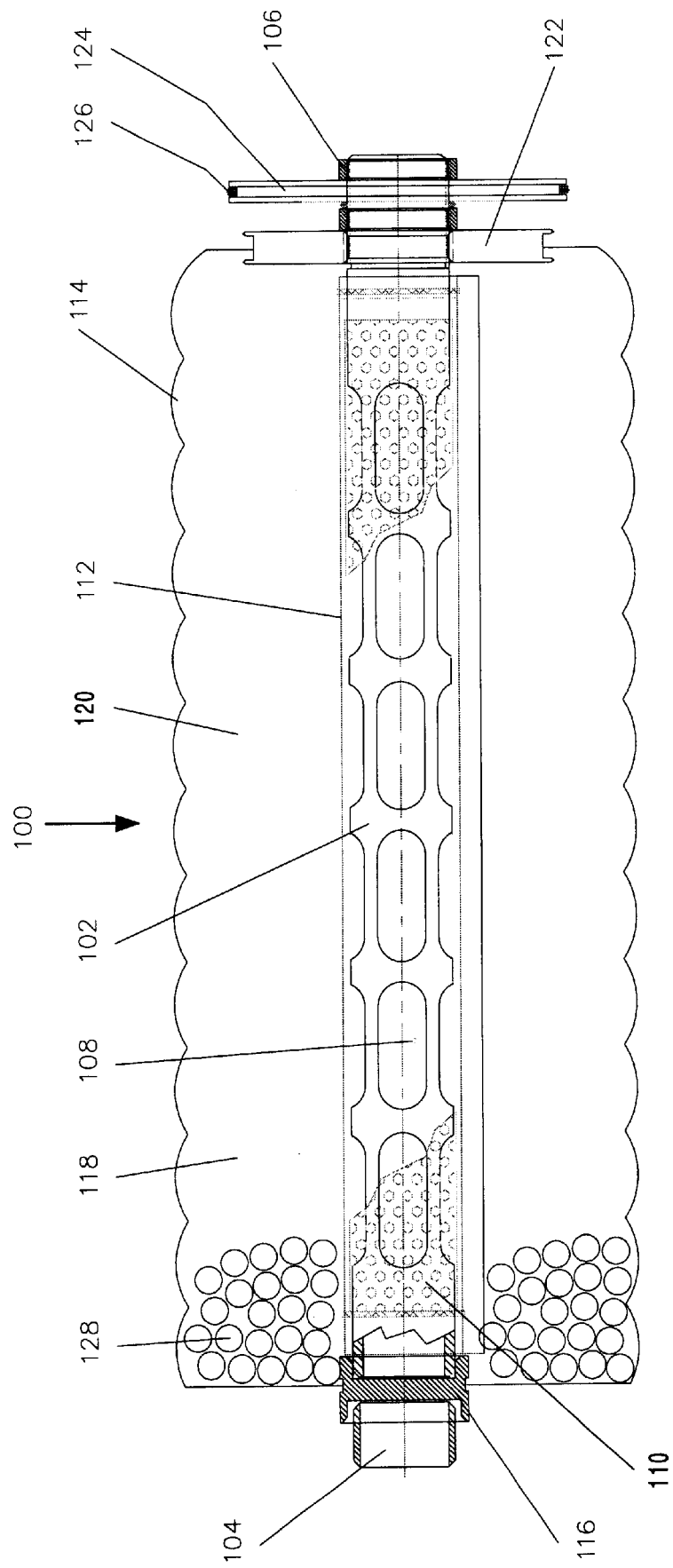
FIG. 2 is a cross-sectional view of the charge of the oil/hydrocarbon removal filtration system of the subject invention.

Referring to FIG. 2, the multi-component charge 100 is assembled away from the filter housing 12 and is inserted into the housing 12 as one unit. The charge 100 comprises a center tube 102 which runs the length of the charge 100 and is as long as the upright housing 12 of the filter. The center tube 102 is composed of polyvinyl chloride (PVC) or chlorinated polyvinyl chloride (CPVC), as are the housing 12 and end caps 18,26 mentioned above. The center tube 102 includes a first end 104 which is adapted to couple to the aperture 20 of the lower, first end cap 18 of the filter housing 12 and a second end 106 which likewise is adapted to couple to the aperture 28 of the upper, second end cap 26 of the housing 12. The center tube 102 includes a series of vertical slots 108 placed circumferentially around the tube 102. As will be shown below, in normal use, water flowing through the filtration system 10 will exit the housing 12 through the center tube 102 after passing through the filtering medium. The large vertical slots 108 are position on the center tube 102 to allow ample open area for the fluid to exit the housing 12 resulting in the least amount of differential pressure across the charge 100. To prevent the filtering medium from passing though the large vertical slots 108 of the center tube 102, a sleeve 110 form from an extruded polypropylene mesh is slid over the center tube 102. The sleeve 110 has perforations which are about an eighth of an inch in size, which is still large enough to allow the filtering medium to pass. A micron-rated polypropylene fabric 112 surrounds the sleeve 110 and prevents the filtering medium from entering the center tube 102 and being discharged. The fabric 112 is a 300 micron-rated monofilament polypropylene fabric which is in direct contact with the filtering medium. An additional polypropylene fabric 114 is then stitched into a cylindrical form with a diameter slightly smaller than a diameter of the cylindrical housing 12. One end of the cylindrical fabric 114 is secured to a first disc 116 which is located at the lower end 104 of the center tube 102. The fabric 114 is secured to the disc 116 with a standard heavy-duty cable tie. The area between the first polypropylene fabric 112 and the cylindrical fabric 114 defines an annular cavity 118 which holds and retains the filtering medium 120.

The filtering medium 120 consist of three parts: peat, anthracite and bentonite. The peat is an engineered material and has the characteristics of being hydrophobic and oleophilic, that is, it has the ability to resist water while attracting oil or hydrocarbons. The engineered peat has a weight-absorption ratio of 8-to-1, meaning that for every pound or given volume of peat, it can remove eight times that weight in oil. Since the peat is compressible, the anthracite and bentonite are added to the medium composition to create voids 128 in it so that the peat does not become fully compressed and unable to pass water. Anthracite is a hard natural coal that burns slowly and gives off intense heat. Anthracite is not compressible and facilitates the flow of water through the peat. Bentonite is an absorbent aluminum silicate clay formed from volcanic ash. While the bentonite also facilitates the flow of water through the peat, it also has hydrocarbon absorbent properties. Although mixture of the three components of the medium can be custom blend depending of the application, the preferred mixture will be 50% peat by weight, 25% anthracite by weight and 25% bentonite by weight.

Once the filtering medium 120 is placed in the charge 100, the top of the cylindrical fabric 114 is secured to a second disc 122 to completely retain the filtering medium 120 within the charge 100. The charge 100, which is substantially cylindrical when assembled, is placed in the interior chamber 32 of the housing 12. A horizontal partitioning disc 124 is positioned above the second disc 122 to come into contact with the wall of the cylindrical housing 12. The partitioning disc 124 divides the interior chamber 32 of the housing 12 into a lower chamber 36 and an upper chamber 38. The partitioning disc 124 is formed to accept an O-ring 126 to ensure a liquid-tight separation between the lower 36 and upper 38 chambers. The upper, second end cap 26 is then secured in place by retaining elements 40 to complete the filtering assembly 10.

In normal usage, a fluid from the oil-water separators is pump to the filtering system 10 through the inlet pipe 24 located at lower end 14 of the cylindrical housing 12. The liquid fills the lower, interior chamber 36 and becomes pressurized by the partitioning disc 124. The liquid is then forced through the filtering medium 120 and the inner sleeve 110 toward the center tube 102. As the liquid passes through the outer polypropylene fabric 114, particulate matter is caught in the fabric and is prevented from entering the medium 120. As particulate-free liquid is forced through the medium 120, oil/hydrocarbons are absorbed and oil-free water flows to the upper chamber 38 and out the upper, second end cap 26 through the outlet pipe 30. The oil-free water can now be discharged into the surrounding waters without any environmental impact.

Although the focus is oil, the filtering medium 120 will absorb any type of hydrocarbon due to the oleophilic nature of the medium 120. The medium 120 encapsulates hydrocarbons virtually instantaneously requiring no prolonged contact time. Once encapsulated, the hydrocarbons will not leach back from the medium 120. A typical listing of liquid hydrocarbons which can be removed from contaminated water in accordance with the present invention includes gasoline, motor oil, diesel oil, benzene, alkyl benzene such as ethyl benzene, o-, m-, and p-xylene, chlorinated solvents, polychlorinated bisphenols, mixtures thereof, etc. It is also important to note that the filtering system 10 of the present invention can also remove emulsified oil, that is, oil that is in solution as opposed to separated from water. So when an oil-water separator can only separate oil if it is not emulsified because it has to allow mechanical separation, the filtering medium 120 of the subject invention will absorb emulsified oil in addition to pure hydrocarbons.

To illustrate the effectiveness of its oil/hydrocarbon removal capability, the following non-limiting working example is now presented.

Assume for the purposes of this example that a flow rate of 44gallons per minute of bilge water contains 100 PPM of oil or hydrocarbons. Given the above flow rate and oil content, 2.2 pounds of oil per hour would flow though the filtering system. A typical filtering system for large marine vessels would be configured with 8 filters piped in parallel, with each filter holding 12 pounds of filtering medium, therefore, a total system would comprise 96 pounds of filtering medium. Using a mixture of 50% peat by weight, 25% anthracite by weight and 25% bentonite by weight, the filtering medium will have an absorption rate of 4× its weight or approximately 384 pounds of oil. Given the fact that oil weighs approximately 8 pounds, 48 gallons of oil will be removed by the filtering system. At 2.2 pounds of oil per hour in the flow stream, the 8 filtering changes would run for 174.5 hours before the system reaches a saturation point of 384 pounds of oil where the charge would have to be replaced. During this time period, 1,745 tons or 460,680 gallons of water can be treated resulting in a discharge water containing 0 PPM of oil/hydrocarbons.

The output of the system will be continuously monitored to ensure the hydrocarbon levels are below 15 PPM. As the charge 100 becomes spent or filled with oil/hydrocarbons, the output level will begin to rise indicating the charge needs to be replaced. The differential pressure across the filter 10 will also be monitored. An increase in differential pressure will indicate the filter 10 is becoming clogged or blocked. This blockage usually results from particulate matter loading on the outer surface of the polypropylene fabric 114. To resolve the particulate loading, especially when the charge is not spent, the new and improved filtering system has back-washing capabilities. In backwashing mode, air and water are introduced in the opposite direction from the normal flow path. While this process disposes of the particulate filtered by the system, the filtering medium 120 will retain the oil/hydrocarbons.

The charge 100 of the filtering system 10 of the subject invention can be disposed in two ways without any environmental impact. First, since the medium 120 of the charge 100 is organic, it is biodegradable. If the charge 100 was buried in a landfill, it would retain the oil without leaching it into the ground water. Once the oil degrades, the medium 120 would also biodegrade naturally. Secondly, because of the oil and chemistry of the medium, the charge 100 will maintain a very high BTU value, about 17,000 per pound, when burned. Therefore, the charges 100 can be incinerated onboard of a vessel and used as fuel by the vessel's incinerator. Also, due to the composition of the medium 120, the charge 100 will burn cleanly resulting in ash of only 2% of the total weight of the charge 100.

As it readily apparent numerous modifications and changes may readily accurate to those skill in the art, and hence, it is not desire to limit the invention to the exact construction and operation as shown and described, and accordingly, all suitable modification equivalent may be resorted to form within the scope of the invention as claimed.

What is claimed is:

1. A hydrocarbon removal filtration system, said system comprising:

a generally cylindrical, upright housing including a lower and upper end, said housing defining an interior chamber;

a first end cap formed with a threaded aperture, said first end cap positioned to close-off said lower end of said housing;

a second end cap formed with a threaded aperture, said second end cap positioned to close-off said upper end of said housing;

support elements positioned below said lower end of said housing to support said housing;

an inlet pipe coupled to said aperture of said first end cap;

an outlet pipe coupled to said aperture of said second end cap; and a hydrocarbon removal charge disposed within said interior chamber of said housing, said hydrocarbon removal charge having;

a center tube having a diameter and lower and upper end, said center tube includes vertical slots disposed circumferentially about said center tube;

a mesh sleeve having a diameter slightly larger then said diameter of said center tube, said sleeve being disposed about said center tube;

a micron-rated fabric sleeve closely secured about said mesh sleeve; and a micron-rated cylindrical fabric, said cylindrical fabric being secured at said lower end of said center tube to form an annular cavity with said fabric sleeve.

2. A system as in claim 1, wherein said micron-rated fabric is composed of polypropylene.

3. A system as in claim 1, wherein said hydrocarbon removal charge further comprises a filtering medium disposed within said annular cavity, said medium comprises peat, anthracite and bentonite.

4. A system as in claim 3, wherein said medium is composed of peat in the range of 40% to 60% by weight.

5. A system as in claim 3, wherein said medium is composed of anthracite in the range of 10% to 40% by weight.

6. A system as in claim 3, wherein said medium is composed of bentonite in the range of 10% to 40% by weight.

7. A system as in claim 1, wherein said center tube is formed from a material chosen from the group consisting of polyvinyl chloride and chlorinated polyvinyl chloride.

8. A system as in claim 1, wherein said mesh sleeve is composed of extruded polypropylene.

9. A system as in claim 3, said system further comprises means for interrupting introduction of a liquid through said inlet pipe into said chamber, means for introducing pressurized flushing liquid and air into said outlet pipe in a direction opposite to a normal flow; and means for withdrawing said flushing liquid, whereby particulate filtered by said cylindrical fabric may be dislodged therefrom and drained.

10. A hydrocarbon removal charge comprising;

a center tube having a diameter and a lower and upper end, said center tube includes vertical slots disposed circumferentially about said center tube;

a mesh sleeve having a diameter slightly larger then said diameter of said center tube, said sleeve being disposed about said center tube;

a micron-rated fabric sleeve closely secured about said mesh sleeve; and a micron-rated cylindrical fabric, said cylindrical fabric being secured at said lower end of said center tube to form an annular cavity with said fabric sleeve.

11. A hydrocarbon removal charge as in claim 10, wherein said micron-rated fabric is composed of polypropylene.

12. A hydrocarbon removal charge as in claim 10, wherein said hydrocarbon removal charge further comprises a filtering medium disposed within said annular cavity, said medium comprises peat, anthracite and bentonite.

13. A hydrocarbon removal charge as in claim 12, wherein said medium is composed of peat in the range of 40% to 60% by weight.

14. A hydrocarbon removal charge as in claim 12, wherein said medium is composed of anthracite in the range of 10% to 40% by weight.

15. A hydrocarbon removal charge as in claim 12, wherein said medium is composed of bentonite in the range of 10% to 40% by weight.

16. A hydrocarbon removal charge as in claim 10, wherein said center tube is formed from a material chosen from the group of consisting polyvinyl chloride and chlorinated polyvinyl chloride.

17. A hydrocarbon removal charge as in claim 10, wherein said mesh sleeve is composed of extruded polypropylene.

* * * * *